Figure 2:
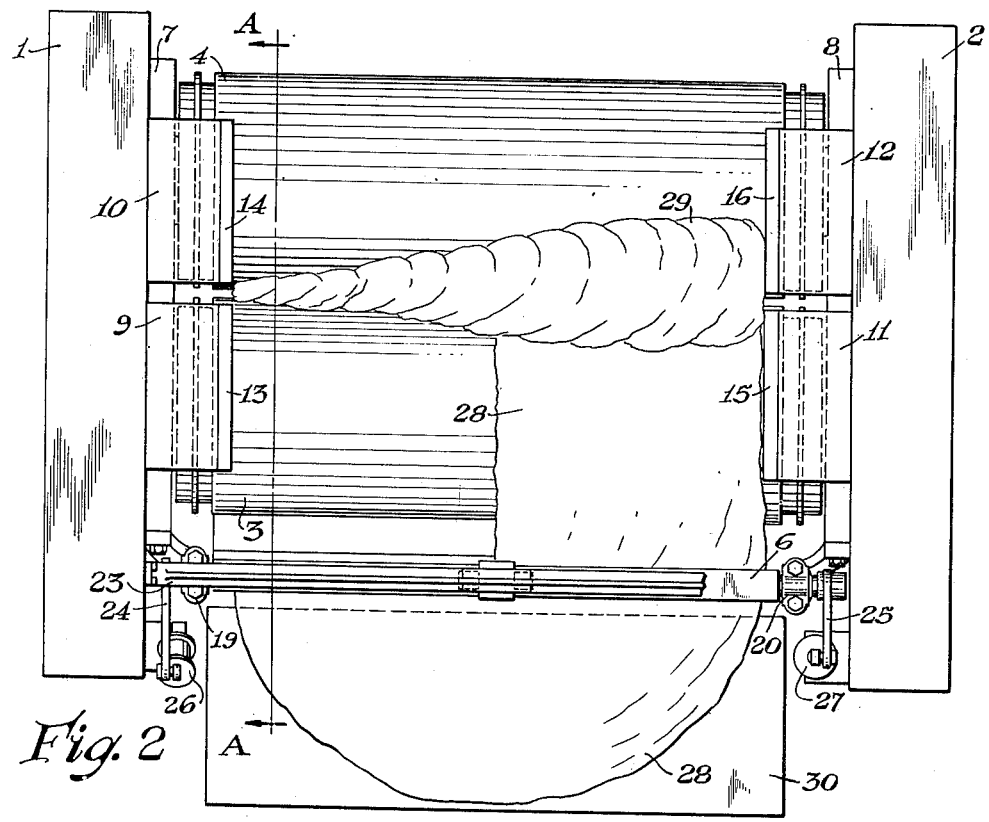

INVENTORS.
Alden W. Hanson
BY Walter E. Donaldson

Griswold & Burdick
ATTORNEYS

Feb. 24, 1953 A. W. HANSON ET AL 2,629,129
MACHINE FOR MILLING PLASTICS
Filed July 28, 1950 2 SHEETS—SHEET 2

INVENTORS.
Alden W. Hanson
BY Walter E. Donaldson

Griswold & Burdick
ATTORNEYS

Patented Feb. 24, 1953

2,629,129

UNITED STATES PATENT OFFICE 2,629,129

MACHINE FOR MILLING PLASTICS

Alden W. Hanson, Midland, and Walter E. Donaldson, Midland County, Mich., assignors to The Dow Chemical Company, Midland, Mich., a corporation of Delaware Application July 28, 1950, Serial No. 176,274

2 Claims. (Cl. 18—2)

This invention concerns an improved machine for milling thermoplastic materials so as to permit ready and efficient incorporation of addition agents therewith to form substantially uniform plastic compositions.

A usual method for incorporating addition agents, e. g. dyes, pigments, plasticizers, lubricants, vulcanizing agents, or fillers, etc., together with a thermoplastic material is to form a mechanical, and far from uniform, mixture of the thermoplastic material and the substance, or substances, to be incorporated therewith and to pass the mixture repeatedly between heated compounding rolls. Such milling is effective in causing substantially uniform incorporation of the addition agent with the thermoplastic material at each individual point along the length of the rolls. However, it does not assure uniformity of composition throughout the body of the thermoplastic mass under treatment, i. e. the milled mixture at one point on the rolls often contains a far greater concentration of the addition agent than that at another point along the length of the rolls.

This failure to obtain efficient distribution, lengthwise to the rolls, of an addition agent in a thermoplastic body has been overcome in the rubber compounding art by cutting the rubber mixture from a section of one of the compounding rolls, folding the strip and causing it to be drawn again into the rolls so as to cause flow of the heat-plastified material lengthwise on the rolls. Such operations of cutting, stripping, folding and again feeding a rubber mixture to compounding rolls are continued until the mixture has been milled to the desired exent, after which the operator again cuts the sheet of material on a roll and withdraws it from the rolls. These cutting, folding and stripping operations are often performed manually. Not only are the milling operations laborious and hazardous, but skill is required to produce successive batches of product of the same composition and degree of uniformity.

It has been proposed that the steps of cutting material from the roll to bare part of the latter and of folding the material upon itself in the interval between passages over the rolls be accomplished mechanically by plows situated at one or more points along the length of the rolls. For instance, U. S. Patent No. 2,067,458 provides a double-faced plow situated obliquely across one end of a roll for plowing material from said end toward the center, or the opposing end, of the roll. The plow is mounted on a swivel which permits it to be applied alternately to opposite ends of the roll. The plows heretofore used for turning, or folding, material on the rolls so as to facilitate transverse mixing, i. e. lengthwise along the rolls, are not adapted for final removal of the milled material from the rolls. Such final removal of a thermoplastic composition from the rolls is accomplished either by manual cutting of the composition lengthwise along a roll and withdrawal of a sheet or blanket of the composition from the rolls, or by means of a separate blade applied along the length of a roll in a position parallel to the roll axis.

It is an object of this invention to provide an improved, and relatively simple, compounding machine comprising two or more compounding rolls and a single set of blades which are adapted both for turning, or folding, a film, sheet, or blanket of thermoplastic material during treatment on the rolls and, when desired, for stripping and removing the thermoplastic material from the rolls. Another object is to provide a method of operating the machine so as to accomplish turning or folding of a thermoplastic material during milling of the same on the machine and for thereafter cutting the material on a roll and removing it from the machine. Other objects will be evident from the following description of the invention.

Figure 1:
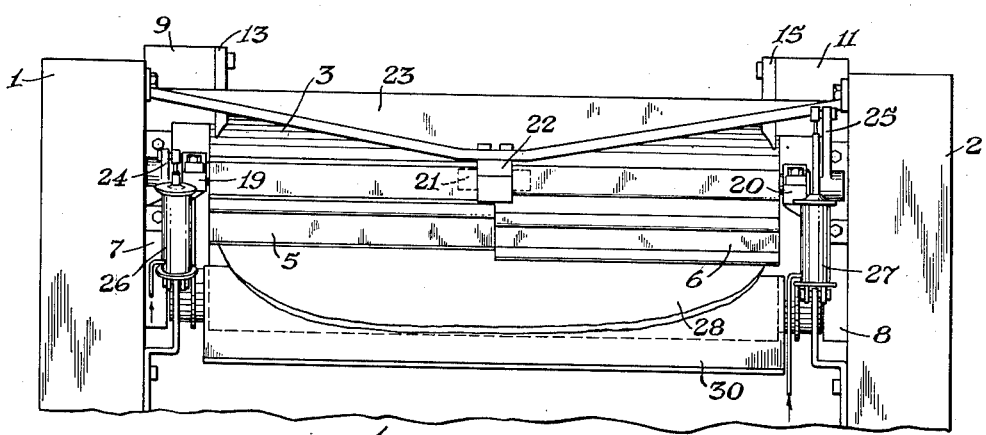
Figure 3:
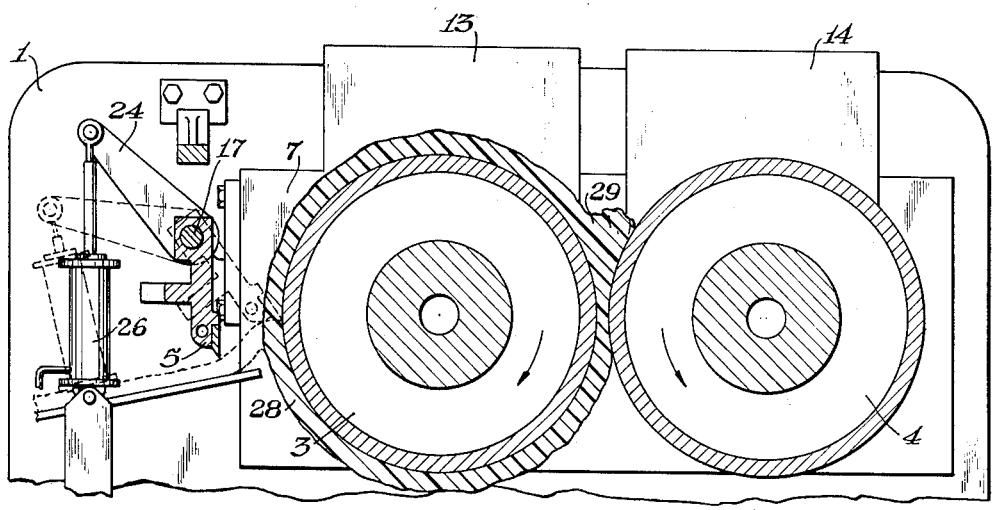
Figure 4:
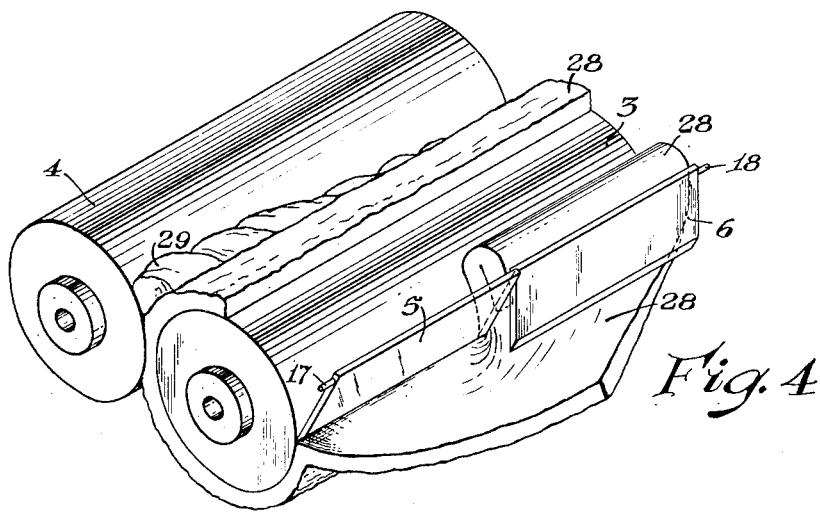

The accompanying drawing shows several views of a machine constructed in accordance with the invention and illustrates certain stages in operation of the machine. In the drawing, Fig. 1 is a front view of the machine. Fig. 2 is a top view of the compounding rolls, 3 and 4, and of certain other working parts of the machine. It shows plastic material being stripped as a layer from one-half of a roll, folded onto a layer of similar material on the other half of the roll and the two layers being returned together to the bank above and between the rolls. Fig. 3 is an end view of the section A—A in the direction of the arrows as indicated in Fig. 2. It shows the rolls 3 and 4 and other operative parts, particularly the blade 5 and means for operating the same, of the machine. Fig. 4 is a schematic, perspective view of the rolls and blades in operation. It shows an early stage in the operations of cutting a blanket 28 of thermoplastic material from one end of a compounding roll to bare a section of the latter and of applying the material thus removed from one end of the roll as a second layer of such material on the peripheral surface of the other half of the roll.

In the drawing, the numerals 1 and 2 represent framework for supporting a pair of hollow compounding rolls, 3 and 4, a pair of blades 5 and 6, and other operative parts of the machine. The shafts (not shown) of rolls 3 and 4 are hollow to permit passage of steam or other temperature-control fluids through the rolls. Said shafts pass through and are supported by the bearing blocks 7 and 8 which are mounted on the aforementioned framework. At the ends, the roll shafts are provided, as usual, with gears for operation of the rolls, but the gears are concealed by the framework of the machine and are not shown. Conventional means for transverse movement of one of the rolls to adjust the spacing between the rolls are also concealed by the framework and are not shown. Blocks 9 and 10 are mounted on frame 1 immediately above bearing block 7 and end portions of the respective rolls 3 and 4. Blocks 11 and 12 are similarly mounted on frame 2 immediately above bearing block 8 and end portions of rolls 3 and 4. Plates 13, 14, 15, and 16 are mounted on inner surfaces of the respective blocks 9, 10, 11 and 12 with curved lower surfaces of said plates adjacent to end sections of the peripheral surfaces of rolls 3 and 4. It may be mentioned that the blocks 9–12 and plates 13–16 are conventional elements of compounding machines and that they serve to wipe end portions of the rolls so as to prevent material being compounded on the rolls from creeping into the bearings supporting the rolls. Each of the blades 5 and 6 may be hollow, as indicated in Fig. 3, to permit passage of a cooling fluid therethrough. Blades 5 and 6 are provided at the ends adjacent to the respective frames 1 and 2, with projecting shafts 17 and 18, respectively. The shafts 17 and 18 pass through, and are supported by the bracketed bearings 19 and 20 which are mounted on frames 1 and 2, respectively. The inner ends of blades 5 and 6 are each provided with a recess, as indicated by dotted lines, which recess accommodates a connecting pin 21 which is held in place by a split block 22 that is bolted to a heavy bracket 23. The ends of the bracket 23 are bolted to the frames 1 and 2, respectively, of the machine. In Fig. 2, an end portion of the bracket 23 is shown as broken away, so as to expose the butt of blade 6. Shafts 17 and 18 of blades 5 and 6 are fitted with levers 24 and 25, respectively. Lever 24 connects with the piston rod of a pneumatic engine, 26, for swinging an edge of blade 5 to and from the peripheral surface of roll 3. Similarly, lever 25 connects with the piston rod of a pneumatic engine, 27, for swinging an edge of blade 6 to and from the peripheral surface of roll 3. The pneumatic engines, 26 and 27 are mounted on the respective frames 1 and 2 of the machine. The blades 5 and 6 are in end to end position with a clearance, usually, of from $\frac{1}{64}$ to $\frac{1}{32}$ inch between the adjacent ends of their cutting edges. They are hinged, as just described, so that the edge of either blade may independently be swung to or from the peripheral surface of roll 3. The numeral 28 designates a layer of plastic material being worked by the machine. The numeral 29 designates a bank of plastic material above and between the rolls 3 and 4. A pan, 30, for receiving plastic material from the machine is shown schematically in Figs. 1 and 2.

Except for the mode of operating blades 5 and 6, and the movement of plastic material under treatment which results from operation of the blades, the compounding of a mixture of thermoplastic material and an addition agent on the above-described machine is carried out in conventional manner. The compounding rolls 3 and 4 are rotated and roll 3 is heated, e. g. by passage of steam through the same. If desired, both rolls may be heated internally with steam, but usually water is passed through roll 4 to provide a cooling action and prevent overheating. In either instance, roll 3 is brought to a temperature higher than that of roll 4. In practice, roll 3 is usually maintained at temperatures in the order of from 160° to 200° C. and roll 4 at temperatures of from 100° to 150° C., but temperatures lower or higher than just stated can be used. The mixture which is to be compounded is applied to the rolls. Such mixture is usually added as a bank above the nip between the rolls, but may be applied in other ways. It becomes heat-plastified, due to heat from the rolls and the mechanical working to which it is subjected, and a portion of the mixture is squeezed between the rolls and forms a layer on the peripheral surface of the hotter roll. Both of the blades 5 and 6 are lowered against roll 3 for a short time, e. g. during one revolution or less and usually from $\frac{1}{4}$ to $\frac{1}{2}$ revolution of roll 3. A short strip of the plastic layer is thereby removed from the surface of roll 3, with one end of the strip remaining attached to the roll. One of the blades, e. g. blade 6, is raised away from roll 3 while the other blade is retained in its cutting position adjacent to the surface of the roll. The strip of plastic material which had been loosened, except at one of its ends, from roll 3 and that which continues to be stripped from the roll by the blade remaining in cutting position, is pulled over and folded onto the layer of plastic material on the other half of roll 3, due to the combined action of the rolls and the blade in the cutting position, and the double layer of plastic material is carried by the roll to the bank, 29. Thereafter, both blades are raised out of contact with roll 3 so that the plastic mixture becomes redistributed over the rolls. The foregoing operations are then repeated, except that the relative positions of the blades may, or may not, be reversed in the operation wherein one blade is raised while the other remains in cutting position. The entire sequence of operations just described causes movement of the plastic mixture over the length of the rolls and is continued until the mixture is rendered substantially homogeneous. Both blades are then lowered against the rotating roll 3, thereby stripping the layer of plastic material from the roll and removing it from the machine.

The following example describes practice of the invention with a particular set of starting materials and employing the machine as illustrated in the drawing. The example is not to be construed as limiting the invention.

*Example*

A non-uniform mixture of granular polystyrene and 2.3 per cent by weight of the pigment, titanium dioxide, is poured into the bank between rolls 3 and 4 of the machine shown in the drawing. In the machine employed, each roll is 54 inches long and of 20 inches diameter and the rolls 3 and 4 are rotated at rates of 20 and 23 R. P. M., respectively, but the sizes of the rolls and the rates of rotation may be varied widely. Also, in the machine which is employed, roll 3 is heated by passage of steam therethrough and the temperature of roll 4 is controlled and maintained below that of roll 3 by passing water through the same, the rate of water flow being increased when it is desired to lower the temperature of the roll and being reduced when an increase in temperature is desired. At the start of operation, the rolls 3 and 4 are spaced closely together to prevent loss of the powdered and granular materials through the nip between the rolls. Heat from roll 3 and heat generated by the milling action of the rolls brings the polystyrene to the condition of a heat-plastified mass having the pigment embedded therein. The spacing between the peripheral surfaces of rolls 3 and 4 at the nip is then increased to about ⅞ inch, the blades 5 and 6 being raised away from roll 3, whereupon a layer of the mixture forms on the hotter roll, 3. At this and further stages in the process, the roll 3 is maintained at a temperature of about 190° C. and roll 4 is maintained at about 120° C., but either roll may be at temperatures lower or higher than just stated. After the plastic mass is brought to a heat-plastified condition and the peripheral surfaces of roll 3 are covered with a sheet or blanket of the heat-plastified mixture, both of the blades 5 and 6 are lowered momentarily to cut and strip a blanket of the plastic mixture from the surface of roll 3. Cutting with both blades is continued for only a short time, usually during from ¼ to ½ of a single revolution of roll 3, but both blades may be retained in the cutting position over a shorter or longer period, e. g. over a period of from $\frac{1}{10}$ to one full revolution of roll 3. One of the blades is retained in cutting position and the other blade, e. g. blade 6, is raised away from roll 3. This, coupled with the rotating action of roll 3, results in the blanket of plastic material which has been stripped from roll 3 by both blades, and which continues to be stripped from an end section of said roll by blade 5, to be drawn over and rest on the layer of plastic material on the other half of the roll so that both layers are carried under the blade 6 and into the bank above the rolls. Operation in this manner is continued during one or more, e. g. from 2 to 20 or more, revolutions of roll 3. Both blades are then raised and the plastic material is permitted to redistribute itself over the operative length of the rolls. Both blades are again lowered for a short time, e. g. during from ¼ to ½ revolution of roll 3, after which blade 5 is raised, causing the material which continues to be stripped from roll 3 by blade 6, to be carried over and folded onto the layer of plastic material on the opposing half of the roll so that both layers are carried under the raised blade 5 and into the bank above the rolls. The foregoing series of operations of the blades is repeated until the pigment is uniformly incorporated throughout the body of polystyrene under treatment. Both of the blades 5 and 6 are then lowered so as to strip the blanket of the colored polystyrene composition from roll 3 and thus discharge the composition from the machine.

The method, as herein described, may be applied for incorporation of other addition agents in polystyrene, or other organic thermoplastic materials. It may be applied with advantage for incorporating usual addition agents, e. g. vulcanizers, anti-oxidants, fillers, etc., in natural or synthetic rubbers to obtain rubbery compositions of good uniformity. It may also be applied for incorporating pigments, plasticizing agents, stabilizing agents, lubricants, or fillers, etc., in thermoplastic resinous materials such as the solid polymers of alpha-methyl styrene, of ar-chlorostyrene, of ar-vinyl toluene, of ar-vinylxylene, of methyl methacrylate, or the solid copolymers of any of such compounds with one another, or styrene, etc.

Other modes of applying the principle of the invention may be employed instead of those explained, change being made as regards the method or apparatus herein disclosed, provided the steps or means stated by any of the following claims or the equivalent of such stated steps or means be employed.

We therefore particularly point out and distinctly claim as our invention:

1. A machine for treating plastic material comprising, in combination, a pair of power driven rolls, on one of which the material from the bank forms in a layer, at least two blades in end to end position extending over the length of the peripheral surface of the roll on which the layer of material forms and at a side of the roll opposite the nip between the rolls, and mechanism for independently moving each blade in and out of contact with the roll.

2. A machine, as described in claim 1, wherein the blades are straight-edged and the edge of each blade is substantially parallel to the axis of each roll.

ALDEN W. HANSON.
WALTER E. DONALDSON.

REFERENCES CITED

The following references are of record in the file of this patent:

UNITED STATES PATENTS

| Number | Name | Date |
|---|---|---|
| 2,155,303 | Conklin | Apr. 18, 1939 |
| 2,200,875 | Edwards et al. | May 14, 1940 |
| 2,259,058 | Allen | Oct. 14, 1941 |
| 2,264,237 | Brown | Nov. 25, 1941 |
| 2,316,283 | Piperoux et al. | Apr. 13, 1943 |
| 2,478,885 | Alvey | Aug. 9, 1949 |
| 2,571,760 | Rathbun | Oct. 16, 1951 |